UUS008231975B2

(12) United States Patent
Peng et al.

(10) Patent No.: US 8,231,975 B2
(45) Date of Patent: Jul. 31, 2012

(54) FLUOROPOLYMER COMPOSITIONS AND TREATED SUBSTRATES

(75) Inventors: Sheng Peng, Hockessin, DE (US); Stephen James Getty, Wilmington, DE (US); Timothy Edward Hopkins, Wilmington, DE (US); Ying Wang, West Chester, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/235,817

(22) Filed: Sep. 19, 2011

(65) Prior Publication Data
US 2012/0070580 A1 Mar. 22, 2012

Related U.S. Application Data

(62) Division of application No. 11/598,337, filed on Nov. 13, 2006, now Pat. No. 8,048,953.

(51) Int. Cl.
B32B 27/00 (2006.01)

(52) U.S. Cl. ........... 428/423.1; 428/422; 428/421; 427/255.6; 427/427.4; 427/428.01; 427/429; 524/589; 524/591; 528/70

(58) Field of Classification Search .......... 427/255.6, 427/427.4, 428.01, 429; 428/423.1, 422, 428/421; 524/589, 591; 528/75
See application file for complete search history.

(56) References Cited

U.S. PATENT DOCUMENTS

| | | | |
|---|---|---|---|
| 3,697,562 A | 10/1972 | Beyleveld et al. | |
| 3,890,376 A | 6/1975 | Jager | |
| 3,979,469 A | 9/1976 | Jager | |
| 4,504,401 A | 3/1985 | Matsuo et al. | |
| 4,505,543 A | 3/1985 | Ueba et al. | |
| 4,587,366 A | 5/1986 | von Werner | |
| 4,810,765 A | 3/1989 | Modena et al. | |
| 4,857,619 A | 8/1989 | Chou et al. | |
| 4,960,543 A | 10/1990 | Wehowsky et al. | |
| 5,189,135 A | 2/1993 | Cozzi et al. | |
| 5,202,372 A | 4/1993 | Moggi et al. | |
| 5,411,766 A * | 5/1995 | Kirchner .................. | 427/393.4 |
| 5,446,214 A | 8/1995 | Caporiccio et al. | |
| 5,459,212 A | 10/1995 | Krespan et al. | |
| 5,481,027 A | 1/1996 | Kirchner | |
| 5,509,939 A | 4/1996 | Kirchner | |
| 5,580,645 A | 12/1996 | Kirchner | |
| 6,025,521 A | 2/2000 | Krespan et al. | |
| 6,479,612 B1 | 11/2002 | Del Pesco et al. | |

FOREIGN PATENT DOCUMENTS

| | | |
|---|---|---|
| DE | 2821495 | 5/1978 |
| GB | 1318898 | 6/1973 |
| JP | 53112855 | 10/1978 |
| JP | 59117504 | 7/1984 |
| JP | 62045786 | 2/1987 |
| JP | 20001081131 | 3/2001 |
| WO | WO 9511877 | 5/1995 |
| WO | WO 97/14842 | 4/1997 |
| WO | WO 2006046643 | 5/2006 |
| WO | WO 2006/116222 A2 | 11/2006 |

OTHER PUBLICATIONS

Maseri et al., Synthesis of fluorinated telomers. Part 4. Telomerization of vinylidene fluoride with commerically available α,ω-diiodoperfluoroalkanes; J. of Fluorine Chemistry, 1995, 74 (1), 59-67.

Balague et al., Synthesis of fluorinated telomers. Part 1, Telomerization of Vinylidene fluoride with perfluoroalkyl iodides, J. of Fluorine Chemistry, 1995, 70 (2) 215-223.

Honda et al., Molecular aggregation structure and surface properties of poly(fluoroalkyl acrylate) thin films; Macromolecules, 2005, 38, 5699-5705.

Balague et al., Controlled step-wise telomerization of vinylidene fluoride, hexafluoropropene and influoroethylene with Iodofluorinated transfer agents; J. of Fluorine Chemistry (2000) 102, 253-268, Elsevier Science S.A.

Montefusco, et al., Original Vinylidene Fluoride-Containing Acrylic Monomers as Surface Modifiers in Photopolymerized Coatings; Macromolecules (2004) 37, 9804-9813, American Chemical Society.

* cited by examiner

Primary Examiner — Ling Choi
Assistant Examiner — Michael L Leonard

(57) ABSTRACT

A polymer having at least one urea linkage prepared by: (i) reacting (a) at least one diisocyanate, polyisocyanate, or mixture thereof, having isocyanate groups, and (b) at least one fluorinated compound selected from the formula (I):

$$R_f(CH_2CF_2)_p(CH_2CH_2)_q(R^1)_r\text{---}XH \quad \text{Formula (I)}$$

wherein
p and q are each independently an integer of 1 to 3;
r is 0 or 1;
X is —O—, —NH— or —S—;
$R^1$ is a divalent radical selected from the group consisting of —S(CH$_2$)$_n$—,

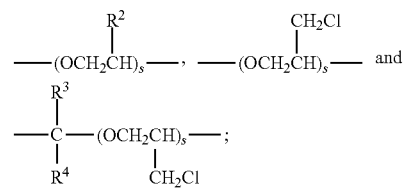

n is an integer of 2 to 4;
s is an integer of 1 to 50;
$R^2$, $R^3$, and $R^4$ are each independently hydrogen or an alkyl group containing 1 to 6 carbon atoms; and
$R_f$ is a perfluoroalkyl group having 1 to 6 carbon atoms; and
(i) reacting with (c) water, a linking agent, or a mixture thereof and methods for treating substrates therewith.

7 Claims, No Drawings

FLUOROPOLYMER COMPOSITIONS AND TREATED SUBSTRATES

This application is a division of application Ser. No. 11/598,337, filed on Nov. 13, 2006, now U.S. Pat. No. 8,048,953.

FIELD OF THE INVENTION

The present invention relates to the use of water-modified fluoropolymers to provide oil repellency, water repellency, stain repellency, soil resistance, stain release, hydrophilicity stain release, and cleanability to substrates.

BACKGROUND OF THE INVENTION

Various compositions are known to be useful as treating agents to provide surface effects to substrates. Surface effects include repellency to moisture, soil, and stains, and other effects, which are particularly useful for fibrous substrates and other substrates such as hard surfaces. Many such treating agents are fluorinated polymers or copolymers.

U.S. Pat. No. 5,411,766 discloses polyfluoro nitrogen containing organic compounds useful to provide oil repellency, water repellency, soil repellency and/or soil release properties to substrates treated therewith. Compounds exemplified contain mixtures of perfluoroalkyl groups having predominantly eight or more carbons.

Most commercially available fluorinated polymers useful as treating agents for imparting repellency to substrates contain predominately eight or more carbons in the perfluoroalkyl chain to provide the desired repellency properties. Honda et al., in Macromolecules, 2005, 38, 5699-5705 teach that for perfluoroalkyl chains of greater than 8 carbons, orientation of the $R_f$ groups is maintained in a parallel configuration while for such chains having less than 6 carbon atoms, reorientation occurs, which decreases surface properties such as contact angle. Thus, shorter chain perfluoroalkyls have traditionally not been successful commercially.

It is desired to improve particular surface effects and to increase the fluorine efficiency; i.e., boost the efficiency or performance of treating agents so that lesser amounts of the expensive fluorinated polymer are required to achieve the same level of performance or have better performance using the same level of fluorine. It is desirable to reduce the chain length of the perfluoroalkyl groups thereby reducing the amount of fluorine present, while still achieving the same or superior surface effects.

There is a need for polymer compositions that significantly improve the repellency and stain resistance of fluorinated polymer treating agents for fibrous substrates and hard surface substrates while using lower levels of fluorine. The present invention provides such compositions.

SUMMARY OF INVENTION

The present invention comprises a polymer having at least one urea linkage prepared by:

(i) reacting (a) at least one diisocyanate, polyisocyanate, or mixture thereof, having isocyanate groups, and (b) at least one fluorinated compound selected from the formula (I):

$$R_f(CH_2CF_2)_p(CH_2CH_2)_qR^1)_r\text{—}XH \quad \text{Formula (I)}$$

wherein p and q are each independently an integer of 1 to 3;
r is 0 or 1;
X is —O—, —NH— or —S—;

$R^1$ is a divalent radical selected from the group consisting of —S(CH$_2$)$_n$—,

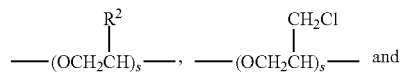

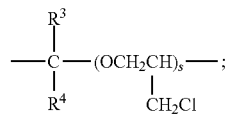

n is an integer of 2 to 4;
s is an integer of 1 to 50;
$R^2$, $R^3$, and $R^4$ are each independently hydrogen or an alkyl group containing 1 to 6 carbon atoms; and
$R_f$ is a linear or branched chain perfluoroalkyl group having 1 to 6 carbon atoms; and (ii) reacting with (c) water, a linking agent, or a mixture thereof.

Another aspect of the invention comprises a method of providing water repellency, alcohol repellency, oil repellency, stain release, hydrophilicity stain release, and cleanability to substrates comprising contacting said substrate with a polymer having at least one urea linkage prepared by: (i) reacting (a) at least one diisocyanate, polyisocyanate, or mixture thereof, having isocyanate groups, and (b) at least one fluorinated compound selected from the formula (I) as disclosed above; and (ii) reacting with (c) water, a linking agent, or a mixture thereof.

Another aspect of the invention comprises a substrate to which has been applied a polymer having at least one urea linkage prepared by: (i) reacting (a) at least one diisocyanate, polyisocyanate, or mixture thereof, having isocyanate groups, and (b) at least one fluorinated compound selected from the formula (I), as disclosed above, and (ii) reacting with (c) water, a linking agent, or a mixture thereof.

Another aspect of the invention comprises a method of providing soil resistance to substrates comprising contacting said substrate with a polymer having at least one urea linkage prepared by:

(i) reacting (a) at least one diisocyanate, polyisocyanate, or mixture thereof, having isocyanate groups, and (b) at least one fluorinated compound selected from the formula (I) as disclosed above; and (ii) reacting with (c) water, a linking agent, or a mixture thereof; with the proviso that when $R_f$ has 1 to 4 carbon atoms, said at least one organic diisocyanate, polyisocyanate, or mixture thereof, comprises one or more cyclic diisocyanate(s) selected from the group consisting of 2,4-toluene diisocyanate; 2,6-toluene diisocyanate; diphenylmethane 4,4'-diisocyanate; diphenylmethane 2,4'-diisocyanate; 3-isocyanatomethyl-3,4,4-trimethylcyclohexyl isocyanate; bis-(4-isocyanatocylohexyl)methane and diisocyanate trimers of formula (IIa), (IIb), (IIc), and (IId):

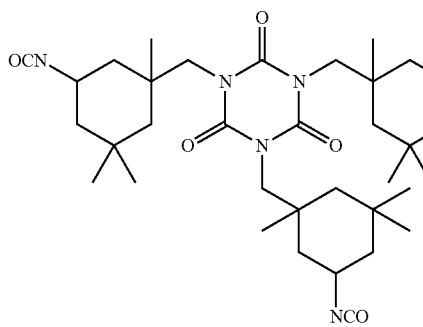
(IIa)

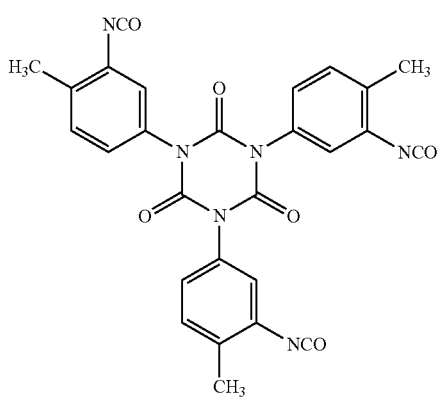
(IIb)

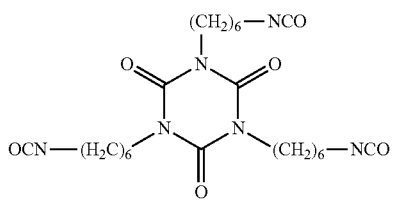
(IIc)

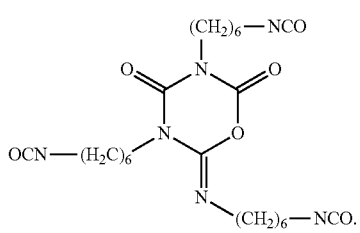
(IId)

DETAILED DESCRIPTION OF INVENTION

Hereinafter trademarks are designated by upper case.

Fluorinated compounds useful in various embodiments of the invention are available by synthesis according to the following scheme:

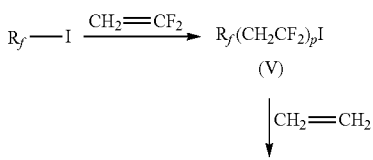

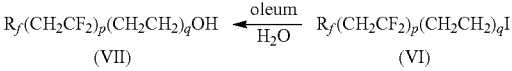

The telomerization of vinylidene fluoride (VDF) with linear or branched perfluoroalkyl iodides is well known and produces compounds of the structure $R_f(CH_2CF_2)_pI$, wherein, p is 1 to 3 or more and $R_f$ is a C1 to C6 perfluoroalkyl group. For example, see Balague, et al., "Synthesis of Fluorinated telomers, Part 1, Telomerization of vinylidene fluoride with perfluoroalkyl iodides", J. Flour Chem. (1995), 70(2), 215-23. The specific telomer iodides (V) are isolated by fractional distillation. The telomer iodides (V) can be treated with ethylene by procedures described in U.S. Pat. No. 3,979,469, (Ciba-Geigy, 1976) to provide the telomer ethylene iodides (VI) wherein q is 1 to 3 or more. The telomer ethylene iodides (VI) can be treated with oleum and hydrolyzed to provide the corresponding telomer alcohols (VII) according to procedures disclosed in WO 95/11877 (Elf Atochem S.A.). The higher homologs (q=2, 3) of telomer ethylene iodides (VI) are available with excess ethylene at high pressure.

The telomer ethylene iodides (VI) can be treated with a variety of reagents to provide the corresponding thiols according to procedures described in J. Fluorine Chemistry, 104, 2 173-183 (2000). One example is the reaction of the telomer ethylene iodides (VI) with sodium thioacetate, followed by hydrolysis.

The telomer ethylene iodides (VI) can be treated with omega-mercapto-1-alkanols according to the following scheme to provide compounds of formula (VIII):

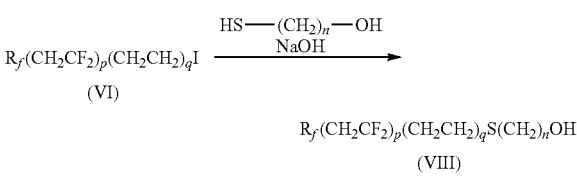

The telomer ethylene iodides (VI) can be treated with omega-mercapto-1-alkylamines according to the following scheme to provide compounds of formula (IX):

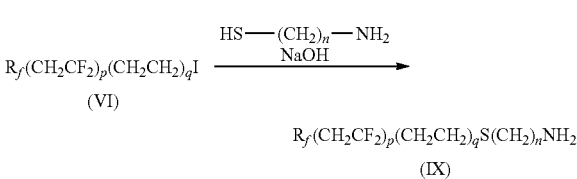

Preferred compounds of formula (VIII) and (IX) for practicing the invention are wherein p and q=1 and n=2 to 3.

Specific fluorinated telomer alcohols derived from telomerization of vinylidene fluoride and ethylene and useful in the invention are listed in Table 1A. The groups $C_3F_7$, $C_4F_9$, and $C_6F_{13}$, referred to in the list of specific alcohols, thiols, and amines in Tables 1A through 1D, and in the examples herein, refer to linear perfluoroalkyl groups unless specifically indicated otherwise.

TABLE 1A

| Compound No. | Structure |
| --- | --- |
| 1 | $C_2F_5CH_2CF_2CH_2CH_2OH$, |
| 2 | $C_2F_5(CH_2CF_2)_2CH_2CH_2OH$, |
| 3 | $C_2F_5(CH_2CF_2)_3CH_2CH_2OH$, |
| 4 | $C_2F_5CH_2CF_2(CH_2CH_2)_2OH$, |
| 5 | $C_2F_5(CH_2CF_2)_2(CH_2CH_2)_2OH$, |
| 6 | $C_4F_9CH_2CF_2CH_2CH_2OH$, |
| 7 | $C_4F_9(CH_2CF_2)_2CH_2CH_2OH$, |
| 8 | $C_4F_9(CH_2CF_2)_3CH_2CH_2OH$, |
| 9 | $C_4F_9CH_2CF_2(CH_2CH_2)_2OH$, |
| 10 | $C_4F_9(CH_2CF_2)_2(CH_2CH_2)_2OH$, |
| 11 | $C_6F_{13}CH_2CF_2CH_2CH_2OH$, |
| 12 | $C_6F_{13}(CH_2CF_2)_2CH_2CH_2OH$, |
| 13 | $C_6F_{13}(CH_2CF_2)_3CH_2CH_2OH$, |
| 14 | $C_6F_{13}CH_2CF_2(CH_2CH_2)_2OH$, |
| 15 | $C_6F_{13}(CH_2CF_2)_2(CH_2CH_2)_2OH$. |

Specific fluorinated telomer thiols derived from telomerization of vinylidene fluoride and ethylene and useful in the invention are listed in Table 1B.

TABLE 1B

| Compound No. | Structure |
| --- | --- |
| 16 | $C_2F_5CH_2CF_2CH_2CH_2SH$, |
| 17 | $C_2F_5(CH_2CF_2)_2CH_2CH_2SH$, |
| 18 | $C_2F_5(CH_2CF_2)_3CH_2CH_2SH$, |
| 19 | $C_2F_5CH_2CF_2(CH_2CH_2)_2SH$, |
| 20 | $C_2F_5(CH_2CF_2)_2(CH_2CH_2)_2SH$, |
| 21 | $C_4F_9CH_2CF_2CH_2CH_2SH$, |
| 22 | $C_4F_9(CH_2CF_2)_2CH_2CH_2SH$, |
| 23 | $C_4F_9(CH_2CF_2)_3CH_2CH_2SH$, |
| 24 | $C_4F_9CH_2CF_2(CH_2CH_2)_2SH$, |
| 25 | $C_4F_9(CH_2CF_2)_2(CH_2CH_2)_2SH$, |
| 26 | $C_6F_{13}CH_2CF_2CH_2CH_2SH$, |
| 27 | $C_6F_{13}(CH_2CF_2)_2CH_2CH_2SH$, |
| 28 | $C_6F_{13}(CH_2CF_2)_3CH_2CH_2SH$, |
| 29 | $C_6F_{13}CH_2CF_2(CH_2CH_2)_2SH$, |
| 30 | $C_6F_{13}(CH_2CF_2)_2(CH_2CH_2)_2SH$. |

Specific fluorinated alcohols of formula (VIII) useful in the invention are listed in Table 1C.

TABLE 1C

| Compound No. | Structure |
| --- | --- |
| 31 | $C_2F_5CH_2CF_2CH_2CH_2SCH_2CH_2OH$, |
| 32 | $C_2F_5(CH_2CF_2)_2CH_2CH_2SCH_2CH_2OH$, |
| 33 | $C_2F_5CH_2CF_2CH_2CH_2SCH_2CH_2CH_2OH$, |
| 34 | $C_2F_5(CH_2CF_2)_2CH_2CH_2SCH_2CH_2CH_2OH$, |
| 35 | $C_4F_9CH_2CF_2CH_2CH_2SCH_2CH_2OH$, |
| 36 | $C_4F_9(CH_2CF_2)_2CH_2CH_2SCH_2CH_2OH$, |
| 37 | $C_4F_9CH_2CF_2CH_2CH_2SCH_2CH_2CH_2OH$, |
| 38 | $C_4F_9(CH_2CF_2)_2CH_2CH_2SCH_2CH_2CH_2OH$, |
| 39 | $C_6F_{13}CH_2CF_2CH_2CH_2SCH_2CH_2OH$, |
| 40 | $C_6F_{13}(CH_2CF_2)_2CH_2CH_2SCH_2CH_2OH$, |
| 41 | $C_6F_{13}CH_2CF_2CH_2CH_2SCH_2CH_2CH_2OH$, |
| 42 | $C_6F_{13}(CH_2CF_2)_2CH_2CH_2SCH_2CH_2CH_2OH$. |

Specific fluorinated amines of formula (IX) useful in the invention are listed in Table 1D.

TABLE 1D

| Compound No. | Structure |
| --- | --- |
| 43 | $C_2F_5CH_2CF_2CH_2CH_2SCH_2CH_2NH_2$, |
| 44 | $C_2F_5(CH_2CF_2)_2CH_2CH_2SCH_2CH_2NH_2$, |
| 45 | $C_2F_5CH_2CF_2CH_2CH_2SCH_2CH_2CH_2NH_2$, |
| 46 | $C_2F_5(CH_2CF_2)_2CH_2CH_2SCH_2CH_2CH_2NH_2$, |
| 47 | $C_4F_9CH_2CF_2CH_2CH_2SCH_2CH_2NH_2$, |

TABLE 1D-continued

| Compound No. | Structure |
| --- | --- |
| 48 | $C_4F_9(CH_2CF_2)_2CH_2CH_2SCH_2CH_2NH_2$, |
| 49 | $C_4F_9CH_2CF_2CH_2CH_2SCH_2CH_2CH_2NH_2$, |
| 50 | $C_4F_9(CH_2CF_2)_2CH_2CH_2SCH_2CH_2CH_2NH_2$, |
| 51 | $C_6F_{13}CH_2CF_2CH_2CH_2SCH_2CH_2NH_2$, |
| 52 | $C_6F_{13}(CH_2CF_2)_2CH_2CH_2SCH_2CH_2NH_2$, |
| 53 | $C_6F_{13}CH_2CF_2CH_2CH_2SCH_2CH_2CH_2NH_2$, |
| 54 | $C_6F_{13}(CH_2CF_2)_2CH_2CH_2SCH_2CH_2CH_2NH_2$. |

To make the fluoropolymers of the present invention, a perfluoroalkyl telomer alcohol of formula (VII), or a corresponding thiol (VIII) or amine (IX), is reacted with a polyisocyanate. The polyisocyanate reactant adds to the branched nature of the polymer. By the term "polyisocyanate" is meant di- and higher isocyanates and the term includes oligomers. Any polyisocyanate having predominately two or more isocyanate groups, or any isocyanate precursor of a polyisocyanate having predominately two or more isocyanate groups, is suitable for use in this invention. For example, hexamethylene diisocyanate homopolymers are suitable for use herein and are commercially available. It is recognized that minor amounts of diisocyanates may remain in products having multiple isocyanate groups. An example of this is a biuret containing residual small amounts of hexamethylene diisocyanate.

Also suitable for use as the polyisocyanate reactant are hydrocarbon diisocyanate-derived isocyanurate trimers. Preferred is DESMODUR N-3300 (a hexamethylene diisocyanate-based isocyanurate available from Bayer Corporation, Pittsburgh, Pa.). Other triisocyanates useful for the purposes of this invention are those obtained by reacting three moles of toluene diisocyanate with 1,1,1-tris-(hydroxymethyl)ethane or 1,1,1-tris(hydroxymethyl)propane. The isocyanurate trimer of toluene diisocyanate and that of 3-isocyanatomethyl-3,4,4-trimethylcyclohexyl isocyanate are other examples of triisocyanates useful for the purposes of this invention, as is methane-tris-(phenylisocyanate). Precursors of polyisocyanate, such as diisocyanate, are also suitable for use in the present invention as substrates for the polyisocyanates. DESMODUR N-3600, DESMODUR Z-4470, and DESMODUR XP 2410, from Bayer Corporation, Pittsburgh, Pa., and bis-(4-isocyanatocylohexyl)methane are also suitable in the invention.

Preferred polyisocyanate reactants are the aliphatic and aromatic polyisocyanates containing biuret structures, or polydimethyl siloxane containing isocyanates. Such polyisocyanates can also contain both aliphatic and aromatic substituents.

Particularly preferred as the polyisocyanate reactant for all the embodiments of the invention herein are hexamethylene diisocyanate homopolymers commercially available, for instance as DESMODUR N-100, DESMODUR N-75 and DESMODUR N-3200 from Bayer Corporation, Pittsburgh, Pa.; 3-isocyanatomethyl-3,4,4-trimethylcyclohexyl isocyanate available, for instance as DESMODUR I (Bayer Corporation); bis-(4-isocyanatocylohexyl)methane available, for instance as DESMODUR W (Bayer Corporation) and diisocyanate trimers of formulas (IIa), (IIb), (IIc) and (IId):

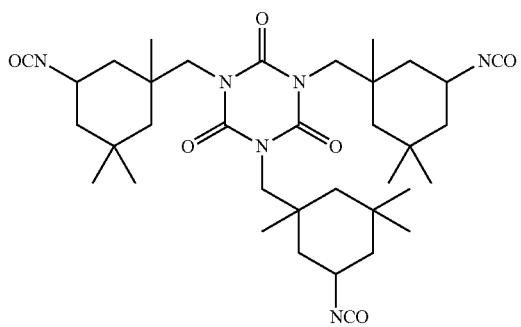
(IIa)

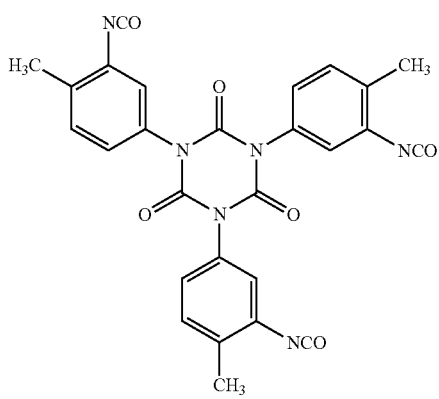
(IIb)

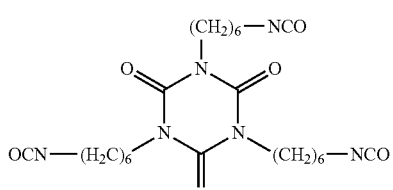
(IIc)

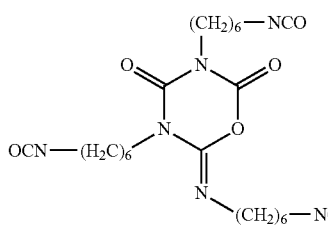
(IId)

The diisocyanate trimers (IIa-d) are available, for instance as DESMODUR Z4470, DESMODUR IL, DESMODUR N-3300, and DESMODUR XP2410, respectively, from Bayer Corporation.

To make the fluoropolymers of the present invention, a perfluoroalkyl telomer alcohol of formula (VII), a corresponding thiol of formula (VIII), or an amine of formula (IX), is reacted with a polyisocyanate to produce a fluoropolymer. The fluoropolymer is typically prepared by charging a reaction vessel with the polyisocyanate, the above fluoroalcohol, fluorothiol or fluoroamine, or mixture thereof, and optionally a non-fluorinated organic compound. The order of reagent addition is not critical. The specific weight of the polyisocyanate and other reactants charged is based on their equivalent weights and on the working capacity of the reaction vessel, and is adjusted so that alcohol, thiol or amine, will be consumed in the first step. The charge is agitated and temperature adjusted to about 40° C.-70° C. Typically a catalyst such as a titanium chelate in an organic solvent is then added and the temperature is raised to about 80° C.-100° C. After holding for several hours, additional solvent and water, a linking agent, or a combination thereof, is added, and the mixture allowed to react for several more hours or until all of the isocyanate has been reacted. More water can then be added along with surfactants, if desired, and stirred until thoroughly mixed. Following homogenization, the organic solvent can be removed by evaporation at reduced pressure, and the remaining aqueous solution of the fluoropolymer used as is or subjected to further processing.

In a preferred embodiment, step (i) reacting, further comprises (d) a non-fluorinated organic compound selected from the group consisting of formula

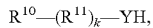

wherein
$R^{10}$ is a $C_1$-$C_{18}$ alkyl, a $C_1$-$C_{18}$ omega-alkenyl radical or a $C_1$-$C_{18}$ omega-alkenyl radical;
$R^{11}$ is

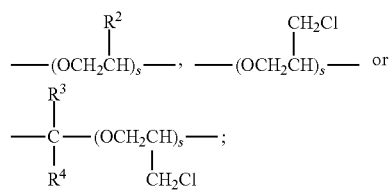

wherein
$R^2$, $R^3$ and $R^4$ are, independently, H or $C_1$ to $C_6$ alkyl;
s is 1 to 50;
k is 0 or 1; and
Y is —O—, —S—, or —N($R^5$)— wherein $R^5$ is H or alkyl containing 1 to 6 carbon atoms.

Preferably the non-fluorinated compound of formula $R^{10}$—$(R^{11})_k$—YH reacts with about 0.1 mol % to about 60 mol % of said isocyanate groups.

In another preferred embodiment, the compound of formula $R^{10}$—$(R^{11})_k$—YH comprises a hydrophilic water-solvatable material comprising at least one hydroxyl-terminated polyether of formula (III):

Formula (III)

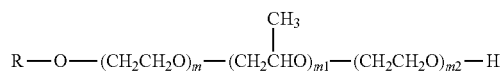

wherein
R is a monovalent hydrocarbon radical containing no more than six aliphatic or alicyclic carbon atoms;
m and m2 are independently an average number of repeating oxyethylene groups, and m1 is an average number of repeating oxypropylene groups, respectively; provided that m is always a positive integer, while m1 and m2 are a positive integer or zero. When m1 and m2 are zero, formula (III) designates an oxyethylene homopolymer. When m1 is a positive integer and m2 is zero, formula (III) designates a block or random copolymer of oxyethylene and oxypropylene. When m1 and m2 are positive integers, formula (III) designates a triblock copolymer designated PEG-PPG-PEG (polyethylene glycol-polypropylene glycol-polyethylene glycol) More preferably, the hydrophilic, water-solvatable components (3) are the commercially available methoxypolyethylene glycols (MPEG's), or mixtures thereof, having an average molecular weight equal to or greater than about 200, and most preferably between 350 and 2000. Also commercially available, and suitable for the preparation of the polyfluoro organic compounds of the present invention, are butoxypolyoxyalkylenes containing equal amounts by weight of oxyethylene and oxypropylene groups (Union Carbide Corp. 50-HB Series UCON Fluids and Lubricants) and having an average molecular weight greater than about 1000.

The non-fluorinated compound of formula $R^{10}$—$(R^{11})_k$—YH is reacted in step (i) with the polyisocyanate and fluorinated compound of formula (I) as described above, prior to the reaction with water, linkage agent, or a mixture thereof. This initial reaction is conducted so that less than 100% of the polyisocyanate groups are reacted. Following the initial reaction, water, linkage agent, or a mixture thereof, is added. The reaction of water or linkage agent with the residual NCO groups completely reacts all of the isocyanate groups and eliminates a further purification step that would be needed if other reactants were used at a ratio sufficient to react with 100% of the isocyanate groups. Further, this addition greatly increases the molecular weight of the polymers and assures proper mixing if more than one reactant is used in the first step of the polymer preparation, i.e., if a water solvatable component is added, it is likely that at least one unit will be present in each polymer.

Linking agents useful in forming polymers of the invention organic compounds have two or more zerewitinoff hydrogen atoms (Zerevitinov, Th., Quantitative Determination of the Active Hydrogen in Organic Compounds, Berichte der Deutschen Chemischen Gesellschaft, 1908, 41, 2233-43). Examples include compounds that have at least two functional groups that are capable of reacting with an isocyanate group. Such functional groups include hydroxyl, amino and thiol groups. Examples of polyfunctional alcohols useful as linking agents include: polyoxyalkylenes having 2, 3 or 4 carbon atoms in the oxyalkylene group and having two or more hydroxyl groups, for instance, polyether diols such as polyethylene glycol, polyethylene glycol-polypropylene glycol copolymers, and polytetramethylene glycol; polyester diols, for instance, the polyester diols derived from polymerization of adipic acid, or other aliphatic diacids, and organic aliphatic diols having 2 to 30 carbon atoms; non-polymeric polyols including alkylene glycols and polyhydroxyalkanes including 1,2-ethanediol, 1,2-propanol diol, 3-chloro-1,2-propanediol, 1,3-propanediol, 1,3-butanediol, 1,4-butanediol, 2,2-dimethyl-1,3-propanediol, 1,2-, 1,5-, and 1,6-hexanediol, 2-ethyl-1,6-hexanediol, 1,8-octanediol, 1,10-decanediol, glycerine, trimethylolethane, trimethylolpropane, 2-ethyl-2-(hydroxymethyl)-1,3-propanediol, 1,2,6-hexanetriol, and pentaerythritol.

Preferred polyfunctional amines useful as linking agents include: amine terminated polyethers such as, for example, JEFFAMINE D400, JEFFAMINE ED, and JEFFAMINE EDR-148, all from Huntsman Chemical Company, Salt Lake City, Utah; aliphatic and cycloaliphatic amines including amino ethyl piperazine, 2-methyl piperazine, 4,4'-diamino-3,3'-dimethyl dicyclohexylmethane, 1,4-diaminocyclohexane, 1,5-diamino-3-methylpentane, isophorone diamine, ethylene diamine, diethylene triamine, triethylene tetraamine, triethylene pentamine, ethanol amine, lysine in any of its stereoisomeric forms and salts thereof, hexane diamine, and hydrazine piperazine; and arylaliphatic amines such as xylylenediamine and a,a,a',a'-tetramethylxylylenediamine.

Mono- and di-alkanolamines that can be used as linking agents include: monoethanolamine, monopropanolamine, diethanolamine, dipropanolamine, and the like.

The fluoropolymers of the present invention are prepared in a suitable dry organic solvent free of groups that react with isocyanate groups. Ketones are the preferred solvents, and methylisobutylketone (MIBK) is particularly preferred for convenience and availability. The reaction of the alcohols with the polyisocyanate is optionally carried out in the presence of a catalyst, such as dibutyltindilaurate or tetraisopropyl titanate, typically in an amount of from about 0.01 to about 1.0 weight %. A preferred catalyst is tetraisopropyl titanate.

The resulting composition is then diluted with water, or further dispersed or dissolved in a solvent selected from the groups comprising simple alcohols and ketones that are suitable as the solvent for final application to substrates, hereinafter the "application solvent".

Alternatively, an aqueous dispersion, made by conventional methods with surfactants, is prepared by removing solvents by evaporation and the use of emulsification or homogenization procedures known to those skilled in the art. Surfactants may include anionic, cationic, nonionic, or blends. Such solvent-free emulsions are preferred to minimize flammability and volatile organic compounds (VOC) concerns.

The final product for application to a substrate is a dispersion (if water based) or a solution (if solvents other than water are used) of the fluoropolymer.

Preferred polymers of the invention are wherein $R_f$ has 4 to 6 carbon atoms, p and q=1 and r=0. Other preferred embodiments are polymers wherein said fluorinated compound reacts with about 5 mol % to about 90 mol %, and more preferably about 10 mol % to about 70 mol %, of said isocyanate groups. Other preferred embodiments are polymers wherein the linking group is a diamine or polyamine.

It will be apparent to one skilled in the art that many changes to any or all of the above procedures may also be used to optimize the reaction conditions for obtaining maximum yield, productivity or product quality.

The present invention further comprises a method of providing water repellency, alcohol repellency, oil repellency, stain release, hydrophilicity stain release, and cleanability to a substrate comprising contacting the polymers of the invention as solutions or dispersions with a substrate. Suitable substrates include fibrous or hard surface substrates as defined below.

A further embodiment of the invention is a method of providing soil resistance comprising contacting the polymers of the invention as solutions or dispersions with a substrate, with the proviso that when $R_f$ has 1 to 4 carbon atoms, said at least one organic diisocyanate, polyisocyanate, or mixture thereof, comprises one or more cyclic diisocyanates selected from the group consisting of 2,4-toluene diisocyanate, 2,6-toluene diisocyanate, diphenylmethane 4,4'-diisocyanate, diphenylmethane 2,4'-diisocyanate, 3-isocyanatomethyl-3,4,4-trimethylcyclohexyl isocyanate, bis-(4-isocyanatocylohexyl)methane and diisocyanate trimers of formula (IIa), (IIb), (IIc), and (IId):

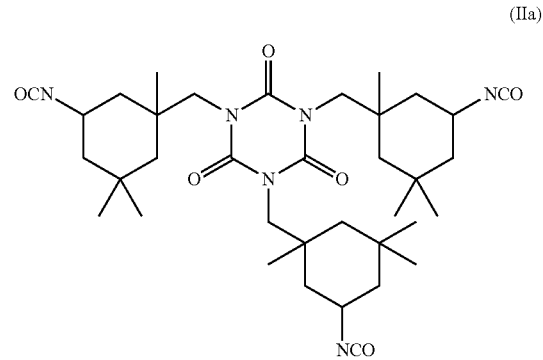

(IIa)

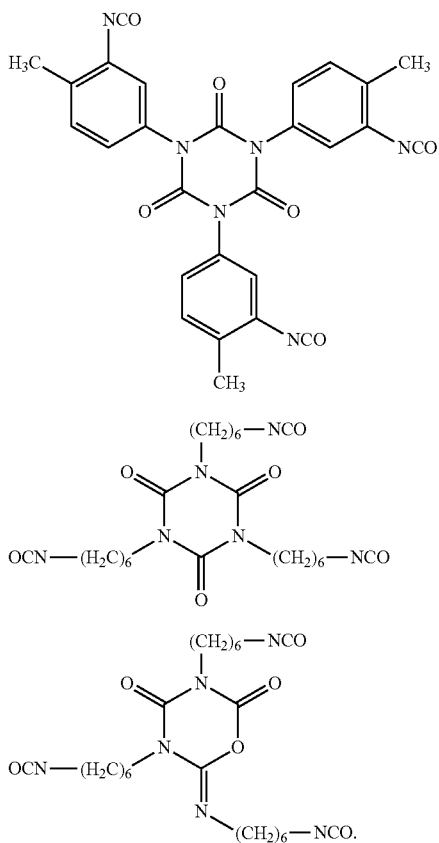

In this embodiment, a preferred method is wherein, within the polymer of the invention, said fluorinated compound of formula (I) has p and q=1, r=0, X=—O—, and $R_f$ has 6 carbon atoms. In another preferred embodiment wherein $R_f$ has 1 to 4 carbon atoms, from about 25% to about 100% by weight, more preferably from about 50% to about 100% by weight, and more preferably from about 70% to about 100% by weight of the cyclic diisocyanate is employed.

The polymers of the invention, as solutions or dispersions, are applied to the substrate surface by any suitable method. Such methods are well known to those skilled in the art, and include, for example, application by exhaustion, foam, flex-nip, nip, pad, kiss-roll, beck, skein, winch, liquid injection, overflow flood, roll, brush, roller, spray, dipping, immersion, and the like. It can also be applied by use of the conventional beck dyeing procedure, continuous dyeing procedure or thread-line application.

The dispersion or solution is diluted for application until the percent total fluorine in the dispersion or solution, based on weight of the dispersion or solution, is from about 0.01% to about 20%, preferably from about 0.01% to about 15%, and most preferably from about 0.01% to about 10% by weight. Application rates for the solution or dispersion of the present invention are in the range of from about 0.5 to about 1000 g/m² depending on the substrate porosity.

The composition of this invention is applied to the substrate as such, or in combination with other finishes or surface treating agents. The composition of the present invention optionally further comprises additional components such as treating agents or finishes to achieve additional surface effects, or additives commonly used with such agents or finishes. Such additional components comprise compounds or compositions that provide surface effects such as no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, stain resist, sun protection, and similar effects. One or more such treating agents or finishes can be combined with the blended composition and applied to the fibrous substrate.

In particular for fibrous substrates, when textiles such as synthetic or cotton fabrics are treated, a wetting agent can be used, such as ALKANOL 6112 available from E. I. du Pont de Nemours and Company, Wilmington, Del. When cotton or cotton-blended fabrics are treated, a wrinkle-resistant resin can be used such as PERMAFRESH EPC available from Omnova Solutions, Chester, S.C.

Other additives commonly used with such treating agents or finishes can also be present such as surfactants, pH adjusters, cross linkers, wetting agents, wax extenders, and other additives known by those skilled in the art. Suitable surfactants include anionic, cationic, nonionic, and combinations thereof. For instance, a suitable anionic surfactant is sodium alkyl sulfate, available as SUPRALATE WAQE from Witco Corporation, Greenwich Conn. Examples of such finishes or agents include processing aids, foaming agents, lubricants, anti-stains, and the like. The composition is applied at a manufacturing facility, retailer location, or prior to installation and use, or at a consumer location.

Optionally a blocked isocyanate to further promote durability can be added to the fluoropolymer of the present invention (i.e., as a blended isocyanate). An example of a suitable blocked isocyanate is HYDROPHOBAL HYDORPHOBOL XAN available from Ciba Specialty Chemicals, High Point N.J. Other commercially available blocked isocyanates are also suitable for use herein. The desirability of adding a blocked isocyanate depends on the particular application for the treating agent. For most of the presently envisioned applications, it does not need to be present to achieve satisfactory cross-linking between chains or bonding to the substrate. When added as a blended isocyanate, amounts up to about 20% by weight can be added.

Optionally, non-fluorinated extender compositions can also be included in the application composition to obtain some combination of benefits. Examples of such an optional additional extender polymer composition is that disclosed in co-pending U.S. Provisional Application 60/607,612 filed Sep. 7, 2004 (CH-2996), and in U.S. Ser. No. 11/175,680 filed Jul. 6, 2005 (CH-3048).

The polymers of the present invention are applied to suitable substrates by a variety of customary procedures. For application to washable apparel fabrics, the polymers are applied, for example, from an aqueous dispersion or an organic solvent solution by brushing, dipping, spraying, padding, roll-coating, foaming or the like. They can be applied to dyed and undyed textile substrates.

For textiles, the composition of the present invention is preferably applied in an amount of from about 5 g/L to about 100 g/L, more preferably from about 10 g/L to about 50 g/L.

In the case of a carpet substrate, the "wet pick up" is the weight of the dispersion or solution of the polymer applied to the carpet, based on the dry weight of the carpet face fiber. A low wet pickup bath system can be interchanged with low wet pickup spray or foam systems, and a high wet pickup bath system can be interchanged with other high wet pickup systems, e.g., flex-nip system, foam, pad, or flood. The method employed determines the appropriate wet pickup and whether the application is made from one side of the carpet (spray and foam applications) or both sides (flex-nip and pad). The following Table 2 provides typical process specifications for application to carpet substrates.

TABLE 2

Typical Wet Pickup Range for Various Applications

| Application | Wet Pickup Range - % |
|---|---|
| Flex-nip | 150-350 |
| Flood | 100-500 |
| Foam | 5-300 |
| Pad | 100-500 |
| Spray | 5-300 |

The dispersion or solution of the composition of the present invention is diluted for application. For carpets the percent total fluorine in the dispersion or solution by weight is preferably from about 0.01% to about 20%, more preferably from about 0.01% to about 5%, and more preferably from about 0.01% to about 2%.

Many variations of the conditions for spray, foam, flex-nip, flood, and pad applications are known to those skilled in the art and the preceding conditions are provided as examples and are not intended to be exclusive. The dispersion or solution of the present invention is typically applied to a carpet at a wet pickup of about 5% to about 500%, and preferably cured at from about 220° F. (104° C.) to about 260 (127° C.). Alternatively, the treated carpet can be air dried. Optionally the carpet can be pre-wetted before application of the dispersion or solution of the present invention. To pre-wet the carpet, the carpet is immersed in water and the excess water suctioned off. The "wet pickup" is the weight of the dispersion or solution of the present invention applied to the carpet based on the dry weight of the carpet face fiber.

For fibrous substrates, the amount of polymer applied is an amount sufficient to provide at least 100 micrograms per gram to about 5000 micrograms per gram by weight of fluorine based on the weight of dry substrate. For carpets after drying, the treated carpet preferably contains about 100 micrograms per gram to about 1000 micrograms per gram fluorine based on the weight of the dried carpet.

For leather substrates, the composition of the present invention is applied by spraying onto dry or semi-wet hides, applied during processing, or applied after completion of the normal tanning, retanning, or dying processes. It is preferred to combine the application of the polymer with the manufacturing process during the final stages of leather manufacture. The amount of polymer applied to the leather is an amount sufficient to provide a dry leather containing from about 0.2 to about 20 g fluorine/m$^2$, preferably from about 0.2 to about 2.3 g fluorine/m$^2$.

The present invention also comprises substrates treated with the composition of the present invention. Suitable substrates include fibrous substrates. The fibrous substrates include woven and nonwoven fibers, yarns, fabrics, fabric blends, paper, leather, rugs and carpets. These are made from natural or synthetic fibers including cotton, cellulose, wool, silk, polyamide, polyester, polyolefin, polyacrylonitrile, polypropylene, rayon, nylon, aramid, and acetate. By "fabric blends" is meant fabric made of two or more types of fibers. Typically, these blends are a combination of at least one natural fiber and at least one synthetic fiber, but also can include a blend of two or more natural fibers or of two or more synthetic fibers. Carpet substrates can be dyed, pigmented, printed, or undyed. Fibers and yarns in the carpet substrates may be dyed, pigmented, printed, or undyed. Carpet substrates can be scoured or unscoured. Substrates to which it is particularly advantageous to apply the compounds of the present invention so as to impart soil resistant properties include those prepared from polyamide fibers (such as nylon), cotton and blends of polyester and cotton, particularly such substrates being used in tablecloths, washable uniforms and the like.

Another embodiment of the invention is a method wherein the polymer of the invention is applied to a substrate as an additive in a coating. A suitable coating composition, designated "coating base", includes a composition, typically a liquid formulation, of an alkyd coating, Type I urethane coating, unsaturated polyester coating, or water-dispersed coating, and is applied to a substrate for the purpose of creating a lasting film on the substrate surface. These are conventional paints, stains, and similar coating compositions. The polymers of the invention improve the cleanability of the dried coatings.

By the term "alkyd coating" as used herein is meant a conventional liquid coating based on alkyd resins, typically a paint, clear coating, or stain. The alkyd resins are complex branched and cross-linked polyesters containing unsaturated aliphatic acid residues. Conventional alkyd coatings utilize, as the binder or film-forming component, a curing or drying alkyd resin. Alkyd resin coatings contain unsaturated aliphatic acid residues derived from drying oils. These resins spontaneously polymerize in the presence of oxygen or air to yield a solid protective film. The polymerization is termed "drying" or "curing" and occurs as a result of autoxidation of the unsaturated carbon-carbon bonds in the aliphatic acid component of the oil by atmospheric oxygen. When applied to a surface as a thin liquid layer of formulated alkyd coating, the cured films that form are relatively hard, non-melting, and substantially insoluble in many organic solvents that act as solvents or thinners for the unoxidized alkyd resin or drying oil. Such drying oils have been used as raw materials for oil-based coatings and are described in the literature.

By the term "urethane coating" as used hereinafter is meant a conventional liquid coating based on Type I urethane resins, typically a paint, clear coating, or stain. Urethane coatings typically contain the reaction product of a polyisocyanate, usually toluene diisocyanate, and a polyhydric alcohol ester of drying oil acids. Urethane coatings are classified by ASTM D-1 into five categories. Type I urethane coatings contain a pre-reacted autoxidizable binder as described in Surface Coatings Vol. I, previously cited. These are also known as uralkyds, urethane-modified alkyds, oil-modified urethanes, urethane oils, or urethane alkyds, are the largest volume category of polyurethane coatings and include paints, clear coatings, or stains. The cured coating is formed by air oxidation and polymerization of the unsaturated drying oil residue in the binder.

By the term "unsaturated polyester coating" as used hereinafter is meant a conventional liquid coating based on unsaturated polyester resins, dissolved in monomers and containing initiators and catalysts as needed, typically as a paint, clear coating, or gel coat formulation. Unsaturated polyester resins contain as the unsaturated prepolymer the product obtained from the condensation polymerization of a glycol such as 1,2-propylene glycol or 1,3-butylene glycol with an unsaturated acid such as maleic (or of maleic and a saturated acid, e.g., phthalic) in the anhydride form. The unsaturated prepolymer is a linear polymer containing unsaturation in the chain. This is dissolved in a suitable monomer, for instance styrene, to produce the final resin. The film is produced by copolymerization of the linear polymer and monomer by means of a free radical mechanism. The free radicals can be generated by heat, or more usually by addition of a peroxide, such as benzoyl peroxide, separately packaged and added before use. Such coating compositions are frequently termed "gel coat" finishes. In order that curing can take place at room temperature, the decomposition of peroxides into free radicals is catalyzed by certain metal ions, usually cobalt. The solutions of peroxide and cobalt compound are added separately to the mix and well stirred before application. The unsaturated polyester resins that cure by a free radical mechanism are also suited to irradiation curing using, for instance, ultraviolet light. This form of cure, in which no heat is produced, is particularly suited to films on wood or board. Other radiation sources, for instance electron-beam curing, are also used.

By the term "water-dispersed coatings" as used herein is meant coatings intended for the decoration or protection of a substrate composed of water as an essential dispersing component such as an emulsion, latex, or suspension of a film-forming material dispersed in an aqueous phase. "Water-dispersed coating" is a general classification that describes a number of formulations and includes members of the above described classifications as well as members of other classifications. Water-dispersed coatings general contain other common coating ingredients. Water-dispersed coatings are exemplified by, but not limited to, pigmented coatings such as latex paints, unpigmented coatings such as wood sealers, stains, and finishes, coatings for masonry and cement, and water-based asphalt emulsions. A water dispersed coating optionally contains surfactants, protective colloids and thickeners, pigments and extender pigments, preservatives, fungicides, freeze-thaw stabilizers, antifoam agents, agents to control pH, coalescing aids, and other ingredients. For latex paints the film forming material is a latex polymer of acrylate acrylic, vinyl-acrylic, vinyl, or a mixture thereof. Such water-dispersed coating compositions are described by C. R. Martens in "Emulsion and Water-Soluble Paints and Coatings" (Reinhold Publishing Corporation, New York, N.Y., 1965).

By the term "dried coating" as used herein is meant the final decorative and/or protective film obtained after the coating composition has dried, set or cured. Such a final film can be achieved by, for non-limiting example, curing, coalescing, polymerizing, interpenetrating, radiation curing, UV curing or evaporation. Final films can also be applied in a dry and final state as in dry coating.

When used as additives the compositions of the present invention are effectively introduced to the coating base or other composition by thoroughly stirring it in at room or ambient temperature. More elaborate mixing can be employed such as using a mechanical shaker or providing heat or other methods. Such methods are not necessary and do not substantially improve the final composition. When used as an additive to coatings, the compositions of the invention generally are added at about 0.001 weight % to about 5 weight % by dry weight of the composition of the invention in the wet coating or paint. Preferably about 0.01 weight % to about 1 weight %, and more preferably 0.1 weight % to about 0.5 weight % is used.

The compositions of the present invention are useful to provide one or more of excellent water repellency, oil repellency, soil repellency, stain resistance, and cleanability to treated substrates. These properties are obtained using lower fluorine concentrations compared with conventional perfluorocarbon surface treatment agents, providing improved "fluorine efficiency" in the protection of treated surfaces. The compositions of the present invention also allow for the use of shorter fluoroalkyl groups containing 6 or fewer carbon atoms while conventional commercially available surface treatment products typically show poor oil repellency and water repellency performance if the fluoroalkyl groups contain less 8 carbon atoms.

The following examples are intended only to illustrate the invention, and should not be interpreted so as to limit the invention in any way other than by the attached claims.

Materials and Test Methods

The following materials and test methods were use in the examples herein. Compound numbers refer to the list of alcohols in Table 1A.

Compound 6

Ethylene (25 g) was introduced to an autoclave charged with $C_4F_9CH_2CF_2I$ (217 g) and d-(+)-limonene (1 g), and the reactor heated at 240° C. for 12 h. The product was isolated by vacuum distillation to provide $C_4F_9CH_2CF_2CH_2CH_2I$.

Fuming sulfuric acid (70 mL) was added slowly to 50 g of $C_4F_9CH_2CF_2CH_2CH_2I$ and mixture was stirred at 60° C. for 1.5 h. The reaction was quenched with ice-cold 1.5 wt % $Na_2SO_3$ aqueous solution and heated at 95° C. for 0.5 h. The bottom layer was separated and washed with 10 wt % aqueous sodium acetate and distilled to provide compound 6: bp 54-57° C. at 2 mmHg (267 Pascals).

Compound 7

Ethylene (18 g) was introduced to an autoclave charged with $C_4F_9(CH_2CF_2)_2I$ (181 g) and d-(+)-limonene (1 g), and the reactor heated at 240° C. for 12 h. Product was isolated by vacuum distillation to provide $C_4F_9(CH_2CF_2)_2CH_2CH_2I$.

$C_4F_9(CH_2CF_2)_2CH_2CH_2I$ and N-methylformamide (8.9 mL) were heated to 150° C. for 26 h. The reaction was cooled to 100° C., followed by the addition of water to separate the crude ester. Ethyl alcohol (3 mL) and p-toluene sulfonic acid (0.09 g) were added to the crude ester, and the reaction was stirred at 70° C. for 15 minutes (min) Ethyl formate and ethyl alcohol were removed by distillation to give a crude product that was dissolved in ether, washed with aqueous sodium sulfite, water, and brine in series, and dried over magnesium sulfate. The product was then distilled to give compound 7: bp 90-94° C. at 2 mmHg (267 Pascals).

Compound 11

Ethylene (15 g) was introduced to an autoclave charged with $C_6F_{13}CH_2CF_2I$ (170 g) and d-(+)-limonene (1 g), and then the reactor was heated at 240° C. for 12 h. Product was isolated by vacuum distillation to provide $C_6F_{13}CH_2CF_2CH_2CH_2I$.

Fuming sulfuric acid (129 mL) was added slowly to $C_6F_{13}CH_2CF_2CH_2CH_2I$ (112 g). The mixture was stirred at 60° C. for 1.5 h. Then the reaction was quenched with ice-cold 1.5 wt % aqueous $Na_2SO_3$ and heated at 95° C. for 0.5 h. The bottom layer was separated and washed with 10 wt % sodium acetate aqueous solution and distilled to provide compound 11: mp 38° C.

Compound 12

Ethylene (56 g) was introduced to an autoclave charged with $C_6F_{13}(CH_2CF_2)_2I$ (714 g) and d-(+)-limonene (3.2 g), and the reactor heated at 240° C. for 12 h. Product was isolated by vacuum distillation to provide $C_6F_{13}(CH_2CF_2)_2CH_2CH_2I$.

$C_6F_{13}(CH_2CF_2)_2CH_2CH_2I$ (111 g) and N-methylformamide (81 mL) were heated to 150° C. for 26 h. The reaction was cooled to 100° C., followed by the addition of water to separate the crude ester. Ethyl alcohol (21 mL) and p-toluene sulfonic acid (0.7 g) were added to the crude ester, and the reaction was stirred at 70° C. for 15 min. Ethyl formate and ethyl alcohol were removed by distillation and the resulting crude alcohol was dissolved in ether, washed with aqueous sodium sulfite, water, and brine in turn, and dried over magnesium sulfate. The product was distilled under vacuum to provide compound 12: mp 42° C.

Test Method 1—Water Repellency

The water repellency of a treated substrate was measured according to AATCC standard Test Method No. 193-2004 and the DuPont Technical Laboratory Method as outlined in the TEFLON Global Specifications and Quality Control Tests information packet. The test determines the resistance of a treated substrate to wetting by aqueous liquids. Drops of water-alcohol mixtures of varying surface tensions are placed on the substrate and the extent of surface wetting is determined visually. The higher the water repellency rating, the better the resistance of a finished substrate to staining by water-based substances. The composition of water repellency test liquids is shown in Table 3.

TABLE 3

Water Repellency Test Liquids

| Water Repellency Rating Number | Composition, Vol. % | |
|---|---|---|
| | Isopropyl Alcohol | Distilled Water |
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |

Testing procedure: Three drops of Test Liquid 1 are placed on the treated substrate. After 10 seconds, the drops are removed by using vacuum aspiration. If no liquid penetration or partial absorption (appearance of a darker wet patch on the substrate) is observed, the test is repeated with Test Liquid 2. The test is repeated with Test Liquid 3 and progressively higher Test Liquid numbers until liquid penetration (appearance of a darker wet patch on the substrate) is observed. The test result is the highest Test Liquid number that does not penetrate into the substrate. Higher scores indicate greater repellency.

Test Method 2—Oil Repellency

The treated samples were tested for oil repellency by a modification of AATCC standard Test Method No. 118, conducted as follows. A substrate treated with an aqueous dispersion of polymer as previously described, is conditioned for a minimum of 2 hours at 23° C. and 20% relative humidity and 65° C. and 10% relative humidity. A series of organic liquids, identified below in Table 4, are then applied dropwise to the samples. Beginning with the lowest numbered test liquid (Repellency Rating No. 1), one drop (approximately 5 mm in diameter or 0.05 mL volume) is placed on each of three locations at least 5 mm apart. The drops are observed for 30 seconds. If, at the end of this period, two of the three drops are still spherical in shape with no wicking around the drops, three drops of the next highest numbered liquid are placed on adjacent sites and similarly observed for 30 seconds. The procedure is continued until one of the test liquids results in two of the three drops failing to remain spherical to hemispherical, or wetting or wicking occurs.

The oil repellency rating is the highest numbered test liquid for which two of the three drops remained spherical to hemispherical, with no wicking for 30 seconds. In general, treated samples with a rating of 5 or more are considered good to excellent; samples having a rating of one or greater can be used in certain applications.

TABLE 4

Oil Repellency Test Liquids

| Oil Repellency Rating Number | Test Solution |
|---|---|
| 1 | NUJOL Purified Mineral Oil |
| 2 | 65/35 NUJOL/n-hexadecane (v/v) at 21° C. |
| 3. | n-hexadecane |
| 4 | n-tetradecane |
| 5 | n-dodecane |
| 6 | n-decane |
| 7 | n-octane |
| 8 | n-heptane |

Note:
NUJOL is a trademark of Plough, Inc., for a mineral oil having a Saybolt viscosity of 360/390 at 38° C. and a specific gravity of 0.880/0.900 at 15° C.

Test Method 3A—Accelerated Soiling Drum Test

A drum mill (on rollers) was used to tumble synthetic soil onto carpet samples. Synthetic soil was prepared as described in AATCC Test Method 123-2000, Section 8. Soil-coated beads were prepared as follows. Synthetic soil, 3 g, and 1 liter of clean nylon resin beads [SURLYN ionomer resin beads, 1/8-3/16 inch (0.32-0.48 cm) diameter, were placed into a clean, empty canister. SURLYN is an ethylene/methacrylic acid copolymer, available from E. I. du Pont de Nemours and Co., Wilmington, Del. The canister lid was closed and sealed with duct tape and the canister rotated on rollers for 5 min. The soil-coated beads were removed from the canister.

Carpet samples to insert into the drum were prepared as follows. Total carpet sample size was 8×25 inch (20.3×63.5 cm) for these tests. The carpet pile of all samples was laid in the same direction. The shorter side of each carpet sample was cut in the machine direction (with the tuft rows). Strong adhesive tape was placed on the backside of the carpet pieces to hold them together. The carpet samples were placed in the clean, empty drum mill with the tufts facing toward the center of the drum. The carpet was held in place in the drum mill with rigid wires. Soil-coated resin beads, 250 cc, and 250 cc of ball bearings (5/16 inch, 0.79 cm diameter) were placed into the drum mill. The drum mill lid was closed and sealed with duct tape. The drum was run on the rollers for 2½ min at 105 revolutions per minute (rpm). The rollers were stopped and the direction of the drum mill reversed. The drum was run on the rollers for an additional 2½ minutes at 105 rpm. The carpet samples were removed and vacuumed uniformly to removes excess dirt. The soil-coated beads were discarded.

The Delta E color difference for the soiled carpet was measured for the test and control items versus the original unsoiled carpet. Color measurement of each carpet was conducted on the carpet following the accelerated soiling test. For each control and test sample the color of the carpet was measured, the sample was soiled, and the color of the soiled carpet was measured. The Delta E is the difference between the color of the soiled and unsoiled samples, expressed as a positive number. The color difference was measured on each item, using a Minolta Chroma Meter CR-410. Color readings were taken at five different areas on the carpet sample, and the average Delta E was recorded. The control carpet for each test item was of the same color and construction as the test item. A lower Delta E indicates less soiling and superior soil repellency.

Test Method 3B—Floor Traffic Soiling Test Method

Carpets were installed in a busy corridor of a school or office building and subjected to human foot traffic in a controlled test area. The corridor was isolated from exits and had substantial walk-off mats and carpeted areas prior to the soiling test area. The unit "foot traffic" was the passing of one individual in either direction and was recorded with automated traffic counters. A Delta E measurement was made as in Test Method 3A.

Test Method 4—Wicking Test

For the wicking test, 5 drops of DI water were placed on the cotton samples on different areas of the material. The time (in seconds) it took to completely absorb into the cotton was recorded. 180 Seconds was the point where, if the drop had not been absorbed, the test was rated as a fail. Wicking is an indication of hydrophilicity, and test results are referred to herein either as wicking or hydrophilic stain release.

Test Method 5—Stain Release Evaluation

The stain release test was taken from the AATCC Test Method 130-1995. Five drops of either mineral oil or corn oil were placed in the center of the treated cotton sample on a piece of blotter paper. A piece of glassine paper (weighing paper) was placed over the spot and a five-pound weight was placed on top of the paper. After 60 seconds, the weight and glassine paper were removed. Four red dots were marked around the oil spot. The cotton material were placed in the Kenmore washing machine with the following settings of Large load, Warm (100° F.)/Cold, One rinse, Ultra Clean (setting 12), and Normal (fast/slow). Then 100 g of AATCC WOB detergent and 4 lbs. of material including ballasts were added to the washing machine. After washing, the samples were placed in the Kenmore dryer on the high setting for 45 minutes. The samples were rated based on the Stain Release Replica.

TABLE 5

Stain Release Grades

| Grade 5 | Stain equivalent to Standard Stain 5 |
|---|---|
| Grade 4 | Stain equivalent to Standard Stain 4 |
| Grade 3 | Stain equivalent to Standard Stain 3 |
| Grade 2 | Stain equivalent to Standard Stain 2 |
| Grade 1 | Stain equivalent to Standard Stain 1 |

Grade 5 represents the best stain removal and Grade 1 the poorest stain removal.

Test Method 6—Wash Durability

The fabric samples were washed following the washing procedure of International Standard for textile testing. Fabric samples are loaded into a horizontal drum, front-loading type (Type A, WASCATOR Fom71MP-Lab) of automatic washing machine with a ballast load to give a total dry load of 4 lb. A commercial detergent is added (AATCC 1993 standard Reference Detergent WOB) and the washer programmed with high water level with warm water (105° F., 41° C.), 15 minutes normal wash cycle followed by 2 times 13 minutes rinse and then 2 minutes spin dry. The sample and ballast are washed a designated number of times (5HW for 5 washes, 20HW for 20 washes, etc.). After washing, the samples were placed in a Kenmore dryer on the high setting for 45 minutes. The samples are then again tested for stain release using Test Methods 4 and 5. Testing for hydrophilic stain release (wicking) was on 100% Avondale Cotton based on same weight loading (bath concentration 30 g/L).

Test Method 7—Leneta Oil Cleanability Test

The test method described herein is a modification of ASTM 3450-00—Standard Test Method for Washability Properties of Interior Architectural Coatings, which is hereby specifically incorporated by reference. Drawdowns were prepared by applying a coat of coating composition on Leneta Black MYLAR cards (The Leneta Company, Mahwah N.J.) using a BYK-Gardner automatic drawdown machine (BYK-Gardner, Silver Spring Md.) and a 5 mil (0.127 mm) Bird applicator drawdown blade (BYK-Gardner, Silver Spring Md.). The drawdown speed was set to be slow enough to prevent pinholes or holidays in the resulting coating. Several drawdowns were prepared for each paint and additive combination. The coated cards were allowed to dry for seven days for testing cleanability.

Staining media were prepared using VASELINE NURSERY JELLY (Marietta Corporation, Cortland N.Y.) and Leneta Carbon Black Dispersion in Mineral Oil (ST-1) (The Leneta Company, Mahwah N.J.). The petroleum jelly was melted in a clean glass container for 30 minutes in an oven set at 70° C. Then the petroleum jelly was mixed with 5% of its weight of Leneta Carbon Black. For instance, 95 g of petroleum jelly was mixed with 5 g of Leneta Carbon Black to produce 100 g of staining media. The mixed staining media was cooled for several hours in a refrigerator at 4° C.

Cleaning media were prepared using a JOY ULTRA CONCENTRATED COUNTRY LEMON dishwashing liquid (The Procter & Gamble Company, Cincinnati Ohio). Dishwashing liquid was mixed with deionized water at a ratio of 1 g of dishwashing liquid for every 99 g of water.

Each drawdown was stained in the same manner. A staining template was prepared from a MYLAR Leneta card by cutting out a 3" by 1" (7.6 cm by 2.5 cm) strip from the interior of the card. The template was placed over a coated drawdown card to be stained. Staining media was spread over the drawdown card and the template using a spatula so that none of the drawdown card remained visible. Excess stain was removed with a spatula. Stained cards were allowed to set and dry for 60 minutes.

In preparation for cleaning, scrap MYLAR was used to gently scrape the excess dried stain from the stained section of the card, both the washed and unwashed sections. Similarly a c-folded clean paper towel was used to remove unset stain from the entire card, both the washed and unwashed sections. The card was then securely attached to a BYK-Gardner Abrasion tester (BYK-Gardner, Silver Spring, Md.) or other method. A piece of cheesecloth (VWR International, San Diego, Calif.) was attached to the cleaning block on the abrasion tester. The cheesecloth was folded and attached so that the contacting surface was 8 layers thick. Ten mL of cleaning solution prepared as specified above was applied to the contacting surface of the cheesecloth. The abrasion tester was run through 5 cycles (10 wipes) over a stained section of the drawdown card that is henceforth designate as stained and cleaned. Excess cleaning solution was rinsed away with deionized water for a few seconds and then allowed to dry for 2 hours or until completely dry by visible inspection. One section of each stained drawdown card was cleaned in this manner.

Cleanability was determined by evaluating the stained and washed painted portion of the drawdown card in comparison to both the unstained and painted portion of the card and the stained and unwashed painted portion of the card. A Hunter-Lab ULTRASCAN Pro colorimeter (Hunter Associates Laboratory, Inc., Reston, Va.) was used to take three different measurements for each designated painted portion of the drawdown card: stained and washed, unstained, and stained and unwashed. The measurements were averaged to obtain a mean value for that section that is used to evaluate the cleanability rating for that card as described below. The colorimeter was set to read the L* function and the aperture was no larger than ¾ of an inch (1.9 cm).

A cleanability score was calculated ranging from 0-10 wherein 0 is uncleanable, and 10 is completely cleanable. Values 1-9 were established in numerical order equidistant from 0, 10, and one another on a linear slope. The above description fits the following equation: [(mean L*value of stained and washed painted section)−(mean L*value of stained and unwashed painted section)]/[(mean L*value of unstained painted section)−(mean L*value of stained and unwashed painted section)]*10=cleanability rating.

EXAMPLES

Example 1

Under a $N_2$ blanket a flask was charged with DESMODUR N100 (22.5 g, 0.075 mol NCO, 63% in methyl isobutyl ketone, MIBK), methoxypolyoxyethylene glycol (11.21 g, 0.015 mol, MPEG 750, $M_w$ 750) and Compound 6 (10 g, 0.0305 mol). The mixture was heated to 65° C., followed by adding 5% TYZOR titanium isopropoxide in MIBK (1.22 g, E. I. du Pont de Nemours, Wilmington Del.). After 3 h at 95° C., MIBK (13.86 mL) and water (4.44 mL) were added at 85° C. The temperature was lowered to 75° C. and allowed to stir overnight. More water (81.80 mL) was added to the reaction and stirred for 0.5 h. MIBK was removed at reduced pressure to provide a fluoropolymer (Solids 31.38%). The product was tested for wicking and hydrophilic stain release as later described with results in Table 6.

Example 2

A mixture of DESMODUR N100 (63% in MIBK, 16.91 g, 0.056 mol NCO), MPEG 750 (8.59 g, 0.011 mol) and compound 11 (10 g, 0.023 mol) was treated as described in Example 1 to provide a fluoropolymer (Solids 34.5%). The product was tested for wicking and hydrophilic stain release as later described with results in Table 6.

Example 3

A mixture of DESMODUR N100 (63% in MIBK, 18.74 g, 0.062 mol NCO), MPEG 750 (9.375 g, 0.0125 mol) and compound 7 (10 g, 0.0255 mol) was treated as described in Example 1 to provide a fluoropolymer (Solids 27.22%). The product was tested for wicking and hydrophilic stain release as later described with results in Table 6.

Example 4

A mixture of DESMODUR N100 (63% in MIBK, 14.92 g, 0.05 mol NCO), MPEG 750 (7.47 g, 0.01 mol) and compound 12 (10 g, 0.0203 mol) was treated as described in Example 1 to provide a fluoropolymer (Solids 31.53%). The product was tested for wicking and hydrophilic stain release as later described with results in Table 6.

Comparative Example A

The procedure of Example 1 was employed, but using a perfluoroalkylethyl alcohol mixture of the formula $F(CF_2)_bCH_2CH_2OH$, wherein b ranged from 6 to 14, and was predominately 6, 8, and 10. The typical mixture comprised the following: b=6, 27% to 37%; b=8, 28% to 32%; b=10, 14% to 20%; b=12, 8% to 13%; b=14, 3% to 6% and is comparable to a commercial stain release formulation (Solids 33%). The product was tested for wicking and hydrophilic stain release as later described with results in Table 6. The product was also treated for water repellency, oil repellency and soil resistance as later described with results in Table 9.

Example Testing—Hydrophilic Stain Release

Fluoropolymers from Examples 1-4 and comparative Example A were tested for hydrophilic stain release (HSR) on 100% Avondale Cotton (woven white cotton from Avondale Mills, Warrenville, S.C.) based on same weight loading of the fluoropolymer at a bath concentration 30 g polymer dispersion/L.

TABLE 6

Hydrophilic Stain Release on cotton

| Test Conditions | Example No. | | | | |
|---|---|---|---|---|---|
| | 1 | 2 | 3 | 4 | Comp. A |
| F % in the bath | 0.23 | 0.31 | 0.22 | 0.3 | 0.3 |
| Wicking, (sec) | | | | | |
| Initial | 17 | >180 | 8 | >180 | >180 |
| 5HW | 2 | 5 | 1 | >180 | 23 |
| Stain Release-Initial | | | | | |
| Mineral oil | 3+ | 5 | 4 | 5 | 4 |
| Corn Oil | 3 | 5 | 5 | 5 | 4 |
| Stain Release-5HW | | | | | |
| Mineral Oil | 3 | 4 | 4 | 4 | 4 |
| Corn Oil | 3 | 4 | 5 | 5 | 4 |

These fluoropolymers had excellent stain release properties generally comparable to the Comparative Example A comprising fluoropolymer having longer perfluorinated alkyl groups. Example 1 and 3 also provided good hydrophilicity, compared to the comparative sample A of greater than 180 seconds wicking time using the homologue mixture.

Examples 5A and 5B

To a 3-neck round-bottom flask, equipped with a reflux condenser with a nitrogen inlet, a magnetic stirrer, and a temperature probe, was added compound 6 (19.00 g, 57.91 mmol, previously dried over sodium sulfate), and DESMODUR N100 (63% in MIBK, 22.07 g, 73.55 mmol NCO). The mixture was heated to 65° C., followed by the drop-wise addition of dibutyl tin dilaurate (2.0 g of a 0.4 wt % solution in MIBK) resulting in an exotherm. The reaction was held at 84° C. for 2 h, followed by drop-wise addition of MIBK (27 g) and water (0.21 g) and continued heating at 84° C. until isocyanate was no longer detected, using an isocyanate test strip (Aliphatic Isocyanate Surface SWYPE, Colormetric Technologies, Inc., Des Plaines Ill.). The hot product (20.0 g) was added to a hot surfactant solution (70° C., 19.5 g deionized water and 1.63 g Witco C6094 surfactant). The solution was homogenized using a digital sonifier for 5 minutes and MIBK was removed via vacuum distillation to provide an aqueous dispersion of fluoropolymer (5A) (15.5% solids, 5.9% F). The product was tested as later described for water repellency, oil repellency, and soil resistance with results in Tables 7 and 13.

Another sample was prepared using the method described for example 5A, except that the hot product (20.0 g) was added to a hot surfactant solution (70° C., 17 g deionized water, 0.32 g MERPOL SE surfactant, from E. I. du Pont de Nemours, Wilmington, Del., and 1.46 g ARQUAD 16-50 surfactant, Akzo Nobel, Chicago, Ill.). The solution was homogenized using a digital sonifier for 5 minutes and MIBK was removed via vacuum distillation to provide an aqueous dispersion of fluoropolymer (5B) (15.5% solids, 5.7% F). The product was tested as later described for water repellency, oil repellency, and soil resistance with results in Table 8.

Examples 6A and 6B

To a 3-neck round-bottom flask, equipped with a reflux condenser with a nitrogen inlet, a magnetic stirrer, and a temperature probe, was added compound 7 (18.25 g, 46.54 mmol, previously dried over sodium sulfate), and DESMODUR N100 (63% in MIBK, 17.73 g, 59.11 mmol NCO). The mixture was heated to 65° C. Dibutyl tin dilaurate (2.0 g of a 0.4 wt % solution in MIBK) was added drop-wise resulting in an exotherm. The reaction was held at 84° C. for 2 h, followed by drop-wise addition of MIBK (22 g) and water (0.17 g) and followed by heating at 84° C. until isocyanate was no longer detected, using an isocyanate test strip. The hot product (20.0 g) was added to a hot surfactant solution (70° C., 19.5 g deionized water and 1.63 g Witco C6094). The solution was homogenized using a digital sonifier for 5 minutes and MIBK was removed via vacuum distillation to provide an aqueous dispersion of fluoropolymer (6A) (15.5% solids, 6.4% F). The product was tested as later described for water repellency, oil repellency, and soil resistance with results in Tables 7 and 13.

Another sample was prepared using the method described for example 6A, except that the hot product (20.0 g) was added to a hot surfactant solution (70° C., 17 g deionized water, 0.32 g MERPOL SE and 1.46 g ARQUAD 16-50). The solution was homogenized using a digital sonifier for 5 minutes and MIBK was removed via vacuum distillation to provide an aqueous dispersion of fluoropolymer (6B) (15.5% solids, 6.2% F). The product was tested as later described for water repellency, oil repellency, and soil resistance with results in Table 8.

Examples 7A and 7B

To a 3-neck round-bottom flask, equipped with a reflux condenser with a nitrogen inlet, a magnetic stirrer, and a temperature probe, was added compound 11 (18.52 g, 43.26 mmol, previously dried over sodium sulfate), MIBK (5 g) and DESMODUR N100 (63% in MIBK, 16.48 g, 54.94 mmol NCO). The mixture was heated to 45° C. To the solution, dibutyl tin dilaurate (1.6 g, of 0.4 wt % solution in MIRK) was added dropwise. The reaction was held at 84° C. for 1 h. MIBK (29 g) and water (0.21 g) were added dropwise to the reaction, followed by heating at 84° C. until isocyanate was no longer detected, using an isocyanate test strip. The hot product (20.0 g) was added to a hot surfactant solution (70° C., 19.5 g deionized water and 1.58 g Witco C6094). The solution was homogenized using a digital sonifier for 5 minutes and MIBK was removed via vacuum distillation to provide aqueous dispersion of fluoropolymer (7A) (15.5% solids, 8.4% F). The product was tested as later described for water repellency, oil repellency, and soil resistance with results in Tables 7 and 13.

Another sample was prepared using the method described for example 7A, except that the hot product (20.0 g) was added to a hot surfactant solution (70° C., 17 g deionized water, 0.32 g MERPOL SE and 1.49 g ARQUAD 16-50). The solution was homogenized using a digital sonifier for 5 min and MIBK was removed via vacuum distillation to provide an aqueous dispersion of fluoropolymer (7B) (13.2% solids, 7.5% F). The product was tested as later described for water repellency, oil repellency, and soil resistance with results in Table 8.

Examples 8A and 8B

To a 3-neck round-bottom flask, equipped with a reflux condenser with a nitrogen inlet, a magnetic stirrer, and a temperature probe, was added compound 12 (20.93 g, 42.53 mmol, previously dried over sodium sulfate), MIBK (5 g) and DESMODUR N100 (63% in MIBK, 16.20 g, 54.01 mmol NCO). The mixture was heated to 45° C. To the solution, dibutyl tin dilaurate (1.6 g, of a 0.4 wt % solution in MIBK) was added dropwise. The reaction was held at 84° C. for 2 h. IBK (29 g) and water (0.21 g) were added dropwise to the reaction followed by heating at 84° C. until isocyanate was no longer detected, using an isocyanate test strip. The hot product (20.0 g) was added to a hot surfactant solution (70° C., 19.5 g deionized water and 1.58 g Witco C6094). The solution was homogenized using a digital sonifier for 5 min and MIBK was removed via vacuum distillation to provide aqueous dispersion of fluoropolymer (8A) (15.5% solids, 7.6% F). The product was tested as later described for water repellency, oil repellency, and soil resistance with results in Tables 7 and 13.

Another sample was prepared using the method described for example 8A, except that the hot product (24.4 g) was added to a hot surfactant solution (70° C., 17 g deionized water, 0.32 g MERPOL SE and 1.44 g ARQUAD 16-50). The solution was homogenized using a digital sonifier for 5 min and MIBK was removed via vacuum distillation to provide an aqueous dispersion of fluoropolymer (8B) (15.5% solids, 6.7% F). The product was tested as later described for water repellency, oil repellency, and soil resistance with results in Table 8.

Examples 9A and 9B

To a 3-neck round-bottom flask, equipped with a reflux condenser with a nitrogen inlet, a magnetic stirrer, and a temperature probe, was added compound 6 (10.15 g, 31 mmol, previously dried over sodium sulfate), and DESMODUR W (63% in MIBK, 8.89 g, 42.4 mmol NCO). The mixture was heated to 55° C., followed by the drop-wise addition of dibutyl tin dilaurate (1.08 g of a 0.4 wt % solution in MIBK) resulting in an exotherm. The reaction was held at 84° C. for 2 h, followed by drop-wise addition of MIBK (15.6 g) and water (0.10 g) and continued heating at 84° C. overnight. Second portion of water (0.10 g) was added and the reaction was stirred until isocyanate was no longer detected, using an isocyanate test strip (Aliphatic Isocyanate Surface SWYPE, Colormetric Technologies, Inc, Des Plaines, Ill.) The hot product (5 g) was added to a hot surfactant solution (70° C., 5 g deionized water, 0.41 g Witco C6094 surfactant). The solution was homogenized using a digital sonifier for 5 minutes and MIBK was removed via vacuum distillation to provide an aqueous dispersion of fluoropolymer 9A (12% solids, 4.93% F). The product was tested as later described for water repellency, oil repellency, and soil resistance with results in Table 9.

Another sample was prepared using the method described for example 9A, except that the hot product (5 g) was added to a hot surfactant solution ((70° C., 5 g deionized water, 0.08 g of MERPOL SE surfactant, from E.I. DuPont de Nemours, Wilmington, Del., and 0.37 g ARQUAD 16-50 surfactant, Akzo Nobel, Chicago). The solution was homogenized using a digital sonifier for 5 minutes and MIBK was removed via vacuum distillation to provide an aqueous dispersion of fluoropolymer 9B (12% solids, 4.5% F). The product was tested as later described for water repellency, oil repellency, and soil resistance with results in Table 10.

Examples 10A and 10B

To a 3-neck round-bottom flask, equipped with a reflux condenser with a nitrogen inlet, a magnetic stirrer, and a temperature probe, was added compound 6 (10.22 g, 31.2 mmol, previously dried over sodium sulfate), and DESMO-DUR XP-2410 (63% in MIBK, 11.87 g, 42.7 mmol NCO). The mixture was heated to 55° C., followed by the drop-wise addition of dibutyl tin dilaurate (1.08 g of a 0.4 wt % solution in MIBK) resulting in an exotherm. The reaction was held at 84° C. for 2 h, followed by drop-wise addition of MIBK (15.7 g) and water (0.10 g) and continued heating at 84° C. overnight. Second portion of water (0.10 g) was added and the reaction was stirred until isocyanate was no longer detected, using an isocyanate test strip. The hot product (5 g) was added to a hot surfactant solution (70° C., 5 g deionized water, 0.41 g Witco C6094 surfactant). The solution was homogenized using a digital sonifier for 5 minutes and MIBK was removed via vacuum distillation to provide an aqueous dispersion of fluoropolymer 11A (12% solids, 4.36% F). The product was tested as later described for water repellency, oil repellency, and soil resistance with results in Table 9.

Another sample was prepared using the method described for example 10A, except that the hot product (5 g) was added to a hot surfactant solution (70° C., 5 g deionized water, 0.08 g of MERPOL SE surfactant and 0.37 g ARQUAD 16-50 surfactant). The solution was homogenized using a digital sonifier for 5 minutes and MIBK was removed via vacuum distillation to provide an aqueous dispersion of fluoropolymer 10B (12% solids, 4.28% F). The product was tested as later described for water repellency, oil repellency, and soil resistance with results in Table 10.

Examples 11A and 11B

To a 4-neck round-bottom flask, equipped with a reflux condenser with a nitrogen inlet, an overhead stirrer, and a temperature probe, was added compound 11 (170.19 g, 0.3975 mol) and compound 12 (27.70 g, 0.05628 mol), both previously dried over sodium sulfate; MIBK (150 g) and DESMODUR N100 (63% in MIBK, 175.40 g, 0.5763 15 mol NCO). The mixture was heated to 60° C. To the solution, dibutyl tin dilaurate (17 g, of a 0.4 wt % solution in MIBK) was added dropwise resulting in an exotherm. The reaction was held at 84° C. for 2 h. MIBK (100 g) and water (2.24 g) were added dropwise to the reaction followed by heating at 84° C. until isocyanate was no longer detected, using an isocyanate test strip. The hot product (290.0 g) was added to a hot surfactant solution (70° C., 290 g deionized water and 22.87 g Witco C6094). The solution was homogenized using a digital sonifier for 5 minutes and MIBK was removed via vacuum distillation to provide aqueous dispersion of fluoropolymer 11A (24.0% solids, 10.1% F). The product was tested as described below on carpet for floor traffic soiling with results in Tables 11 and 12.

Another sample was prepared using the method described for example 11A, except that the hot product (265.0 g) was added to a hot surfactant solution (70° C., 230 g deionized water, 4.24 g MERPOL SE and 19.08 g ARQUAD 16-50). The solution was homogenized using a digital sonifier for 5 minutes and MIBK was removed via vacuum distillation to provide an aqueous dispersion of fluoropolymer 11B (12.7% solids, 5.1% F). The product was tested as described below on carpet for floor traffic soiling with results in Tables 11 and 12.

Comparative Example B

The procedure of Example 5A was employed, but using a perfluoroalkylethyl alcohol mixture of the formula $F(CF_2)_b CH_2CH_2OH$, wherein b ranged from 6 to 14, and was predominately 6, 8, and 10. The typical mixture comprised the following: b=6, 27% to 37%; b=8, 28% to 32%; b=10, 14% to 20%; b=12, 8% to 13%; b=14, 3% to 6% and is comparable to a commercial carpet product. The product was tested as described below for water repellency, oil repellency, soil resistance, and floor traffic soiling with results in Tables 7, 10, 11 and 12.

Comparative Example C

The procedure of Example 5B was employed, but using as the fluorochemical a perfluoroalkylethyl alcohol mixture of the formula $F(CF_2)_b CH_2CH_2OH$, wherein b ranged from 6 to 14, and was predominately 6, 8, and 10. The typical mixture comprised the following: b=6, 27% to 37%; b=8, 28% to 32%; b=10, 14% to 20%; b=12, 8% to 13%; b=14, 3% to 6% and is comparable to a commercial carpet product. The product was tested as described below for water repellency, oil repellency, soil resistance, and floor traffic soiling with results in Tables 8, 11 and 12.

Example Testing—Water and Oil Repellency and Soiling Resistance

The carpet used for testing of Examples 5 through 10A and 10B consisted of a residential loop carpet construction (30 oz/sq yd) having a nylon 6,6 face fiber that had been dyed to a beige color and had received a stain resist treatment of 1.2% SR-500 (100% solids basis). Carpet was obtained from Invista, Inc., Wilmington, Del. SR-500 is available from E. I. duPont de Nemours and Company, Wilmington, Del.

The commercial carpet used for testing of Examples 9 and 10A and 10B consisted of a commercial loop carpet construction (28 oz/sq yd) having a nylon 6,6 face fiber that had been dyed to a yellow color. Carpet was obtained from Invista, Inc., Wilmington, Del.

Carpets for received a pre-spray application of water at 25% wet pick-up. The carpets were then treated with spray application of the dispersed fluoropolymers at 25% wet pick-up. The dispersions were diluted with water, to the degree necessary to obtain a desired fluorine content delivered to the carpet using 25% wet pick-up. Wet pick-up is the weight of the dispersion or solution of the polymer of the present invention applied to the carpet, based on the dry weight of the carpet face fiber. The treated carpet was then dried to a carpet fiber face temperature of 250° F. (121° C.). The application levels for the compositions are given in Table 7 thru 10. Carpets were tested for water repellency by Test Method 1 and for oil repellency by Test Method 2. Soiling performance of the carpets was evaluated by Test Method 3 accelerated soiling test and evaluated by the color measurement of soiling performance. Results are listed in Table 7 through 10. A lower delta E value indicates less soiling. A "Delta E" unit difference of 1 is significant when compared to visual evaluation. Fluorine content listed as ppm equals micrograms per gram.

TABLE 7

Water and oil repellency and soiling resistance on carpet

| Example | F content, ppm | Water repellency | Oil repellency | Delta E |
|---|---|---|---|---|
| Comparative B | 600 | 6 | 5 | 35.14 |
| 5A | 600 | 4 | 4 | 36.02 |
| 6A | 600 | 4 | 5 | 34.96 |
| 7A | 600 | 5 | 5 | 31.56 |
| 8A | 600 | 6 | 5 | 33.04 |

TABLE 8

Water and oil repellency and soiling resistance on carpet

| Example | F content, ppm | Water repellency | Oil repellency | Delta E |
|---|---|---|---|---|
| Comparative C | 200 | 6 | 5 | 23.74 |
| 5B | 200 | 4 | 5 | 23.32 |
| 6B | 200 | 5 | 5 | 22.78 |
| 7B | 200 | 6 | 6 | 20.88 |
| 8B | 200 | 6 | 6 | 20.18 |

Examples 5 through 8A of the present invention had equal or better resistance to soiling, oil repellency, and water repellency compared to Comparative Examples B and C at similar fluorine loading level.

TABLE 9

Water and oil repellency and soiling resistance on commercial carpet

| Example | F content ppm | Water Repellency | Oil Repellency | Delta E |
|---|---|---|---|---|
| Untreated | 0 | 0 | 0 | 34.80 |
| Comparative A | 400 | 5 | 5 | 27.26 |
| 9A | 400 | 4 | 2 | 30.12 |
| 10A | 400 | 4 | 3 | 29.94 |

TABLE 10

Water and oil repellency and soiling resistance on residential carpet

| Example | Final ppm F | Water Repellency | Oil Repellency | Delta E |
|---|---|---|---|---|
| Untreated | 0 | 0 | 0 | 22.16 |
| Comparative B | 600 | 6 | 6 | 19.00 |
| 9B | 600 | 6 | 5 | 17.78 |
| 10B | 600 | 4 | 4 | 21.36 |

The Examples 9A and 10A listed in Table 9 had better soil resist properties than untreated controls, and were comparable to Comparative Example A that had longer perfluorinated alkyl groups, at similar fluorine loading level. In both cases the water and oil repellency was better than the untreated control.

The fluoropolymer of Example 9B, listed in Table 10, exhibited better soil resist properties than untreated controls and the Comparative Example B that had longer perfluorinated alkyl groups, at similar fluorine loading level. The fluoropolymer of Example 10B, listed in Table 10, exhibited better soil resist properties than untreated control, but less than Comparative Example B. Both Examples 9B and 10B exhibited water and oil repellency better than untreated control; and 9B exhibited water and oil repellency comparable to the Comparative Example B, at similar fluorine loading level.

Example Testing—Floor Traffic Soiling

A residential carpet used for testing of Examples 11A and 11B consisted of a residential loop carpet construction (30 oz/sq yd) having a nylon 6,6 face fiber that had been dyed to a light yellow color and had received a stain resist treatment of 1.2% SR-500 (100% solids basis). The carpets were then treated with spray application of the dispersed fluoropolymers of Examples 11A and 11B and Comparative Examples B and C at 25% wet pick-up. The dispersions were diluted with water, to the degree necessary to obtain a desired fluorine content delivered to the carpet using 25% wet pick-up. The treated carpet was then dried to a carpet fiber face temperature of 250° F. (121° C.). The application levels for the compositions are given in Table 11.

A commercial carpet used for testing of Examples 11A and 11B consisted of a commercial loop carpet construction (28 oz/sq yd) having a nylon 6,6 face fiber that had been dyed to a yellow color. Carpet was obtained from Invista, Inc., Wilmington, Del. The carpets were then treated with spray application of the dispersed fluoropolymers of Examples 11A and 11B and Comparative Examples B and C at 25% wet pick-up. The dispersions were diluted with water, to the degree necessary to obtain a desired fluorine content delivered to the carpet using 25% wet pick-up. The treated carpet was then dried to a carpet fiber face temperature of 250° F. (121° C.). The application levels for the compositions are given in Table 12.

The treated carpets were installed in a busy corridor of a school or office building and were measured for soiling according to Test Method 3B. Results using residential level loop carpet, light yellow, SR500 treated, are listed in Table 11, and the results using the commercial loop carpet are listed in Table 12.

TABLE 11

Floor traffic Soiling[a] - residential carpet

| Example | Fluorine content, ppm | Delta E |
|---|---|---|
| Comparative B | 700 | 19.96 |
| 11A | 700 | 18.65 |
| Comparative C | 700 | 18.22 |
| 11B | 700 | 17.24 |

[a]134,00 traffics

TABLE 12

Floor traffic Soiling[a] - commercial carpet

| Example | Fluorine content, ppm | Delta E |
|---|---|---|
| Comparative B | 700 | 19.43 |
| 11A | 700 | 19.72 |
| Comparative C | 700 | 18.76 |
| 11B | 700 | 17.98 |

[a]134,00 traffics

A lower delta E value indicates less soiling. A "Delta E" unit difference of 1 is significant when compared to visual evaluation. The results in Tables 11 and 12 showed that fluoropolymers of Examples 11A and 11B of the present invention had equal or better soil resist properties in floor traffic testing when compared to Comparative Examples B and C, having longer perfluorinated alkyl groups, at similar fluorine loading level.

Example Testing—Repellency on Leather Substrate

Approximately 30 g of wet, tanned leather (Cow Full Grain) was cut and put into metal canisters with a screw top lid. To each of the canisters was added 100-150 g water. A fluoropolymer (1.2 g of a 7% F solution) was added to each canister. Steel balls (20) were added to each canister, the lids were closed, and the canisters were placed in a launder-O-meter, which was filled with water and preheated to 45° C. The launder-O-meter was run for 30 min. To each of the canisters was then added 3 g of 10 wt % formic acid solution, followed by an additional 20 min cycle in the launder-O-meter. The leather was removed, rinsed with warm deionized water, and air dried for 12 h. This was followed by additional drying at 60° C. in an oven with a nitrogen purge. The leather was then treated for water and oil repellency using the methods described previously.

TABLE 13

Leather Testing Results

| Example No. | Oil Repellency | Water Repellency |
|---|---|---|
| Untreated | 0 | 3− |
| 5A | 0 | 4 |
| 6A | 4 | 7 |
| 7A | 4 | 8 |
| 8A | 3 | 7 |

Example 12

Under a N2 blanket a flask was charged with DESMODUR N-100 (63% in MIBK, 8.79 g, 0.03 mol NCO), methoxypolyoxyethylene glycol (MPEG 350, 4.4 g, 0.0125 mol) and compound 6 (4.1 g, 0.0125 mol). The reaction mixture was heated to 55° C., followed by adding 0.4 wt % dibutyl tin dilaurate solution in MIBK (0.35 g). After 16 h at 90° C., water (0.225 g) was added at 60° C. and reaction was stirred for 3 h. MIBK (4 mL) and water (31.5 mL) were added and the reaction was stirred for 1 h. After evaporating MIBK at reduced pressure, the fluoropolymer was added to latex paint and tested for cleanability as described below with results in Table 14.

Example 13

Compound 11 (5.35 g, 0.0125 mol) was treated under similar conditions as described in Example 12 to provide a fluoropolymer. The product was added to latex paint and tested for cleanability as described below with results in Table 14.

Example 14

Compound 12 (6.15 g, 0.0125 mol) was treated under similar conditions as described in Example 12 to provide a fluoropolymer. The product was added to latex paint and tested for cleanability as described below with results in Table 14.

Example Testing—Leneta Oil Cleanability

Fluoropolymers of Examples 12-14 were mixed as additives in a flat acrylic latex paint having 3% gloss at 85 degrees, and tested using Test Method 7—Leneta Oil Cleanability Test, as described above. Each of the Examples 12-14 was added in an amount to achieve an equivalent fluorine content of 675 ppm (microgram/gram) F based on the weight of the wet paint. Test results are listed in Table 12.

TABLE 14

| Example | Cleanability Rating |
|---|---|
| Control[a] | 3.8 |
| 12 | 6.2 |
| 13 | 5.3 |
| 14 | 4.8 |

[a]No fluoropolymer added to latex paint

The data in Table 14 shows that Examples 12 to 14 of the present invention had improved cleanability compared to the control having no fluoropolymer as an additive.

What is claimed is:

1. A method of providing water repellency, alcohol repellency, and oil repellency, stain release, hydrophilicity stain release, and cleanability to substrates comprising contacting said substrate with a polymer having at least one urea linkage prepared by:
   (i) reacting (a) at least one diisocyanate, polyisocyanate, or mixture thereof, having isocyanate groups, and (b) at least one fluorinated compound selected from the formula (I):

$R_f(CH_2CF_2)_p(CH_2CH_2)_q(R^1)_r$—XH wherein
   p and q are each independently an integer of 1 to 3;
   r is 0 or 1;
   X is —O—, —NH— or —S—;
   $R^1$ is a divalent radical selected from the group consisting of —$S(CH_2)_n$—,

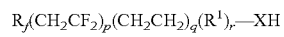

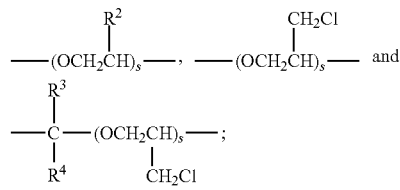

n is an integer of 2 to 4;
   s is an integer of 1 to 50;
   $R^2$, $R^3$, and $R^4$ are each independently hydrogen or an alkyl group containing 1 to 6 carbon atoms; and
   $R_f$ is a linear or branched chain perfluoroalkyl group having 1 to 6 carbon atoms; and
   (ii) reacting with (c) water, a linking agent, or a mixture thereof.

2. The method of claim 1 wherein the polymer is contacted with the substrate as an aqueous dispersion or solution.

3. The method of claim 1 wherein the polymer is contacted with the substrate by means of exhaustion, spray, foam, flex-nip, nip, pad, kiss-roll, beck, skein, winch, liquid injection, overflow flood, brush, roll, spray or immersion.

4. The method of claim 1 wherein for cleanability the polymer is contacted with the substrate as an additive in a coating base.

5. The method of claim 1 wherein the polymer is contacted with the substrate in the presence of an agent providing at least one surface effect selected from the group consisting of no iron, easy to iron, shrinkage control, wrinkle free, permanent press, moisture control, softness, strength, anti-slip, anti-static, anti-snag, anti-pill, stain release, soil repellency, soil release, water repellency, oil repellency, stain resist, odor control, antimicrobial, and sun protection.

6. A method of providing soil resistance to substrates comprising contacting said substrate with a polymer having at least one urea linkage prepared by:
(i) reacting (a) at least one diisocyanate, polyisocyanate, or mixture thereof, having isocyanate groups, and (b) at least one fluorinated compound selected from the formula (I):

$R_f(CH_2CF_2)_p(CH_2CH_2)_q(R^1)_r—XH$   Formula (I)

wherein
p and q are each independently an integer of 1 to 3;
r is 0 or 1;
X is —O—, —NH—, or —S—;
$R^1$ is a divalent radical selected from the group consisting of —S(CH$_2$)$_n$—,

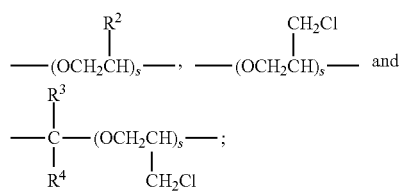

n is an integer of 2 to 4;
s is an integer of 1 to 50;
$R^2$, $R^3$ and $R^4$ are each independently hydrogen or an alkyl group containing 1 to 6 carbon atoms; and
$R_f$ is a linear or branched chain perfluoroalkyl group having 1 or 6 carbon atoms; and then
(ii) reacting with (c) water, a linking agent, or a mixture thereof;
with the proviso that when $R_f$ has 1 to 4 carbon atoms, said at least one organic diisocyanate, polyisocyanate, or mixture thereof, comprises one or more cyclic diisocyanate(s) selected from the group consisting of 2,4-toluene diisocyanate; 2,6-toluene diisocyanate; diphenylmethane 4,4'-diisocyanate; diphenylmethane 2,4'-diisocyanate; 3-isocyanatomethyl-3,4,4-trimethylcyclohexyl isocyanate; bis-(4-isocyanatocylohexyl)methane; and diisocyanate trimers of formula (IIa), (IIb), (IIc), and (IId):

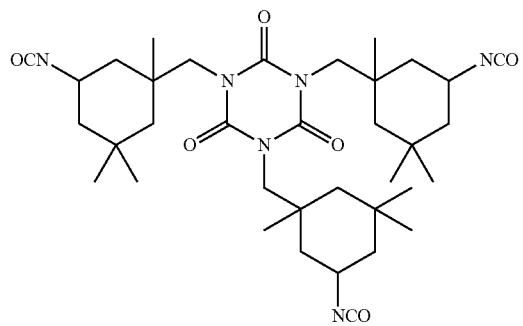
(IIa)

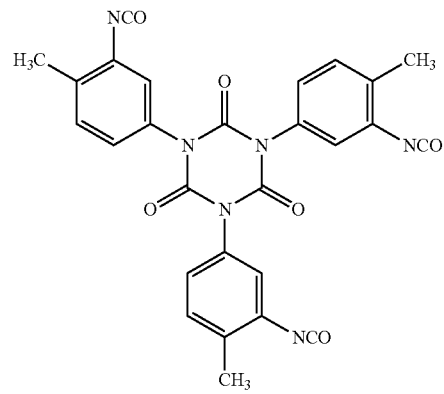
(IIb)

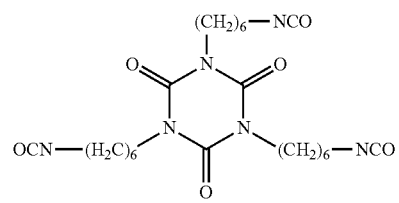
(IIc)

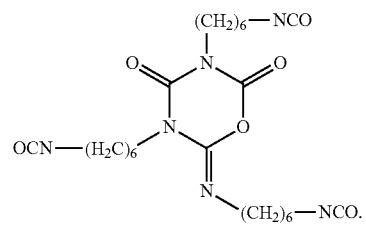
(IId)

7. The method of claim 6 wherein, within said fluorinated compound of formula (I), p and q are each 1, r is 0, X is —O—, and $R_f$ has 6 carbon atoms.

* * * * *